Patented Dec. 6, 1927.

1,651,388

UNITED STATES PATENT OFFICE.

HAROLD C. HARVEY AND HUBERT L. BECHER, OF TRENTON, NEW JERSEY, ASSIGNORS TO THE AGASOTE MILLBOARD COMPANY, OF EWING TOWNSHIP, NEW JERSEY, A CORPORATION OF NEW JERSEY.

WOOD SUBSTITUTE.

No Drawing.  Application filed February 21, 1924.  Serial No. 694,433.

The object of our invention is to produce a sheet or shaped article of compressed fibre such as paper pulp, wood pulp, asbestos fibre, straw, or the like, which has the appearance, strength, texture and other qualities of certain kinds of natural wood.

Our invention contemplates the production of a sheet composed of a mixture of compressed fibre and a substance known in commerce as red accaroid gum which, we understand, is obtained from several species of the Xanthorrhœa trees. This gum has the peculiarity that, when heated, it will become plastic but will not become fluid.

The following examples illustrate our invention:

*Example I.*—Comminuted wood fibre, 100 parts by weight, is mixed with 100 parts of finely comminuted red accaroid gum and 5000 parts of water, and the mixture thoroughly stirred in a beater. The resulting pulp is run into a mold and the majority of the water is removed by pressure. (See United States Letters Patent No. 971,936 dated October 4, 1910 and No. 1,272,566 dated July 16, 1918). The remainder of the water is removed by the application of heat, preferably in a suitably constructed drier. The dried board, which is in a spongy condition, is then subjected to a temperature of 300° F. and to a pressure of 300 pounds to the square inch preferably between platens containing steam filled chambers.

*Example II.*—Same as Example I using 43 parts of the gum and 2000 parts of water and applying a pressure of 600 pounds per square inch.

The proportion of gum to the infusible material may vary within wide limits, and the pressure should be such as to bring about the desired degree of compactness.

We may add to the ingredients hereinabove referred to other suitable ingredients, without departing from the spirit of our invention. Thus we may add coloring matter, oils, bitumen, or sulfur in order to modify the appearance, quality or surface finish of the finished product.

We have found that a mixture of fibre, wood flour or material of a similar kind with red accaroid gum may be molded in ordinary molds if heated to about 300° F.

We claim:

As a new article of manufacture, a compressed sheet comprising a mixture of 100 parts by weight of fibre and from 43 to 100 parts by weight of red accaroid gum.

HAROLD C. HARVEY.
HUBERT L. BECHER.